UNITED STATES PATENT OFFICE.

ROBERT ARNOT, OF BUSHEY, ENGLAND.

DYE AND PROCESS OF MAKING SAME.

1,414,164. Specification of Letters Patent. Patented Apr. 25, 1922.

No Drawing. Application filed August 31, 1921. Serial No. 497,354.

*To all whom it may concern:*

Be it known that I, ROBERT ARNOT, citizen of the Czecho-Slovak Republic, residing at Bushey, Herts, England, have invented certain new and useful Improvements in Dyes and Processes of Making Same, (for which I have made applications for patents in Austria May 12, 1915; in Germany April 20, 1916, and May 5, 1920; in England July 22, 1920, and in France July 23, 1920,) of which the following is a specification.

It has been found that if abietic acid or resins such as colophony which according to Georg Cohn (Chemiker-Zeitung 70/791-2) is more or less impure abietic acid, are treated with nitrating compounds not only nitration takes place but the hydroaromatic abietic acid is oxidized to an aromatic nitro-compound, which is easily reduced and when diazotized gives azo-dyes with suitable components.

The invention consists in nitrating resins, i. e. impure abietic acid and in introducing into them chromophorous or salt forming groups or both, and in employing the bodies obtained either by themselves as dyes or coupled with other substances used in the production of dyes. A large number of dyes in the greatest variety of shades are thus made available.

*Example 1.*

Into 25 parts of well cooled fuming nitric acid (D.=1.52) are gradually introduced 10 parts of finely powdered colophony stirring vigorously the while. This operation, particularly at first, must be performed slowly in order to avoid a too violent reaction. A part of the colophony is dissolved, while the remainder is converted into viscous yellow matter. A further 10 parts of fuming nitric acid are now added, at the prevailing room temperature, and stirring again, and the mixture is heated in the water bath on a slow fire for an hour, during which time the viscous matter becomes completely dissolved. After cooling, the orange coloured solution is poured into cold water, being stirred quickly, which causes the golden yellow nitro-compound to precipitate in powder form. The powder is filtered off and washed until the washing tests neutral. It is readily soluble in alcohol, ether, chloroform, acetic acid, benzol; in alkalis and ammonia it dissolves with an orange-brown colour.

*Example 2.*

The same nitro-compound is obtained if 10 parts of colophony are dissolved in 10 parts of glacial acetic acid by heating and to the cooled solution 15 parts of concentrated nitric acid are added at the prevailing room temperature, while it is well stirred. The solution obtained assumes a colour ranging from orange to brown, and after it has been left standing for an hour, it is poured into cold water, at the same time being stirred, thus causing the nitro-compound to be precipitated as a yellow powder, which being drawn off is frequently washed until the washing tests neutral.

The alkaline salt dyes wool and silk yellow, while wool treated with an iron preparation is dyed green. To produce the alkaline salt the nitro-compound is added to a hot diluted soda or potash solution until the neutralization point is reached, the solution is evaporated and the residue is pulverized. This dyes wool and silk in the acid bath lemon colour to golden yellow. The wool is put in at 50° and 2% sulphuric acid subsequently added, the wool being left for an hour at 90° in the dyeing vat. The dye is only partly discoloured. For the preparation of the iron liquor 4–5% ferrous sulphate and 2–2½% oxalic acid are used.

*Example 3.*

10 parts of the nitro substances are dissolved in 100 parts of 10% caustic soda solution or in 175 parts of 10% soda by heating and a concentrated solution of 20 parts hydrosulphite of sodium is poured into the boiling solution. The mixture is well boiled on the reflux condenser for an hour and hydrochloric acid is gradually added to the solution. This causes the amino acid to isolate, which either may be filtered or acetic acid may be added until the amino acid is dissolved again. The solution is vigorously boiled until the sulphurous acid is entirely eliminated. The solution is then cooled in ice, diazotized, the diazo-substances appearing as a brown deposit. This is then added to such a quantity of the second constituent which is necessary to be in accordance with the quantity of nitrite used. It is advisable to leave the diazotized mixture in ice for a few hours before using. The dye formed is separated after 24 hours by means of salt and filtered. Dyeing on wool as in Example 2.

*Example 4.*

10 parts of abietic acid prepared after prescription of Georg Cohn (Chemiker Zeitung 70/791–2) are dissolved in concentrated sulphuric acid, the solution is heated in the water bath at about 60° for an hour and the mixture poured over ice. The separated sulpho-abietic acid is filtered and dried. 10 parts of it are dissolved in 30 parts of 10% soda-solution and to the solution are added 5 parts of p-nitrodiazobenzol naphthalene-b-sulphonic acid (Paranil) which has been dissolved in 20 parts of 10% soda solution. On standing for a long time the solution turns a bluish-orange colour and the dye is separated from it by salt treatment, then filtered and dried. It dyes orange in the acid bath. The dyeing process is the same as in Example 2. The dye is not discoloured.

For the production of the sulpho-abietic acid the following process may also be used: 10 parts of colophony are dissolved in 10 parts of glacial acetic acid and heated with 10 parts of concentrated sulphuric acid in the water bath at 60°. The solution shows a red brown colour and on being poured over ice the sulpho-abietic acid is separated, which is then drained off and dried.

10 parts of the sulpho-abietic acid are put into 15 parts of concentrated nitric acid at the prevailing room temperature, stirring the while. The mixture has a red brown colour and a nitro substance is separated in the form of a brittle brown mass. This is powdered, washed several times and dried. The reduction and further preparation is effected as in Example 3. The finished dyes are more blue in tone than those of the non-sulphonated nitro-compounds. Dyeing is carried out as in Example 2.

In the appended claims I use the term "chromogenetic" as inclusive of "chromophorous" or "auxochromous," or both.

What I claim is—

1. The process which comprises nitrating a resin and reducing the resulting nitro compound to an amino compound.

2. The process which comprises nitrating a resin, reducing the resulting nitro compound to an amino compound and diazotizing the resulting amino compound.

3. The process which comprises nitrating a resin, reducing the resulting nitro compound to an amino compound, diazotizing the resulting amino compound, and coupling the resulting compound with another compound to form an azo dye.

4. The process which comprises nitrating a resin and introducing thereinto a chromophorous group.

5. The process which comprises nitrating a resin and introducing thereinto a chromophorous group and an auxochromous group.

6. The process which comprises nitrating a resin and introducing thereinto a chromogenetic group.

7. The process which comprises nitrating a resin and introducing thereinto chromogenetic groups.

8. A dye comprising the radical of abietic acid which includes a chromophorous group.

9. A dye comprising the radical of abietic acid which includes a chromophorous group and an auxochromous group.

10. A dye comprising the radical of abietic acid which includes a chromogenetic group.

11. A dye comprising the radical of abietic acid which includes chromogenetic groups.

12. An azo dye comprising a substituted radical of abietic acid.

In testimony whereof I have hereunto set my hand in presence of two subscribing witnesses.

ROBERT ARNOT.

Witnesses:
 DAVID BLACKLUP,
 DAISY JEWELL.